Dec. 27, 1966 J. T. BOAG 3,294,334

TAPE REEL CARTRIDGE

Filed Nov. 22, 1963 2 Sheets-Sheet 1

INVENTOR.
JAMES T. BOAG

BY Arthur H. Swanson

ATTORNEY.

Dec. 27, 1966 J. T. BOAG 3,294,334

TAPE REEL CARTRIDGE

Filed Nov. 22, 1963 2 Sheets-Sheet 2

INVENTOR.
JAMES T. BOAG
BY Arthur H. Swanson
ATTORNEY.

3,294,334
Patented Dec. 27, 1966

3,294,334

TAPE REEL CARTRIDGE

James T. Boag, Littleton, Colo., assignor to Honeywell Inc., a corporation of Delaware Filed Nov. 22, 1963, Ser. No. 325,623
5 Claims. (Cl. 242—55.13)

This invention relates to tape transports. More specifically, the present invention relates to reel drives.

An object of the present invention is to provide an improved reel drive.

Another object of the present invention is to provide an improved reel drive for simultaneously driving a supply reel and a take-up reel in a tape cartridge.

Still another object of the present invention is to provide an improved reel drive for a pair of reels during the movement of a web member therebetween.

A further object of the present invention is to provide an improved reel drive for a pair of reels to tension a web member passing therebetween.

A still further object of the present invention is to provide an improved reel drive for a pair of reels in a tape cartridge to control a one-way motion of a web member from one reel to the other.

Still another further object of the present invention is to provide an improved reel drive, as set forth herein, having a simple operation and construction.

In accomplishing these and other objects, there has been provided, in accordance with the present invention, a reel drive having a pair of concentrically mounted reels arranged on a common axle and supported on respective drive hubs. The drive hub for one reel is arranged with a ring gear on its inner periphery. This ring gear is coupled by idler gears to a drive gear coaxially mounted for rotation on the common axle. The drive gear is, in turn, coupled by a one-way spring clutch to a hub drive for the other reel. A retaining means is provided on the common axle to maintain the reels in a driving relation with their respective drive hubs and the driving means between the drive hubs in engagement therewith.

A better understanding of the present invention may be had when the following detailed description is read in connection with the accompanying drawings, in which.

Figure 1:
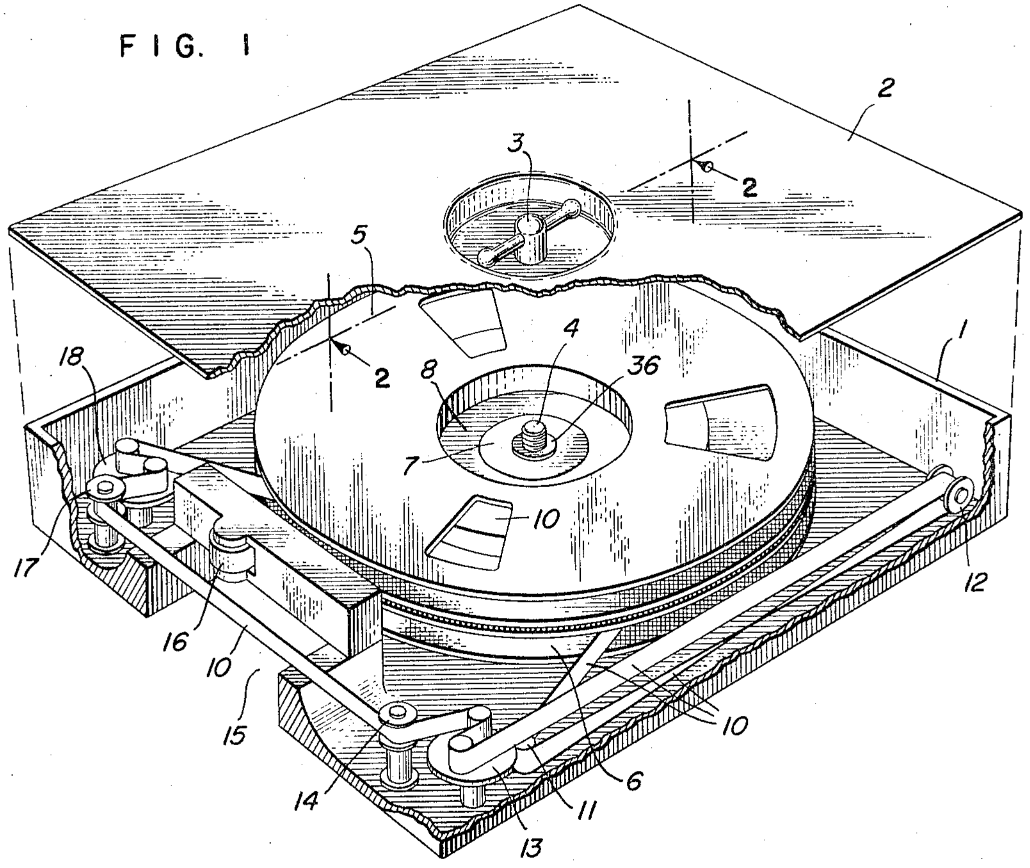
FIG. 1 is a pictorial diagram of a tape cartridge embodying the present invention.

Referring now to FIG. 1, there is shown a tape cartridge having a reel container 1 and a cover 2. The cover 2 is fastened to the container 1 by a captive wing nut 3 which fits on a threaded stud 4 in the container 1. A pair of reels 5 and 6 are mounted concentrically with the stud 4 in a manner disclosed hereinafter. An upper drive hub 7 is arranged in a driving relation with a reel support hub 8 for the upper reel 5.

A tape 10 is supported in a continuous path between the upper reel 5 and the lower reel 6. Specifically, the tape 10 is brought out of the lower reel 6 and around a first roller 11 positioned in a first corner of the container 1. The tape 10 is, then, led down a first side of the container 1 and given a 45° twist before reaching a second roller 12. The second roller 12 is mounted in an adjacent second corner of the container 1 and has an axis of rotation which is at a right angle to that of the first roller 11 and directed down a side of the container 1 forming the second corner with the first side. After passing around the second roller 12, the tape 10 is given a 45° twist to offset the aforesaid twist before being brought back to the first corner of the container 1 where it is disposed on a first tape tension sensitive device 13. The tension sensitive device 13 may be any suitable device which is arranged to absorb transient tape motions by varying the length of the tape path.

Upon leaving the tensioning device 13, the tape 10 is passed over a third roller 14 and down along a third side of the container 1 adjacent to the first side. This side of the container 1 is provided with a cutout section 15. The tape 10 is led across the cutout 15 in front of a pressure roller 16 which is rotatably mounted in the container 1. The tape 10 is, subsequently, guided to a third corner of the container 1 adjacent to the first corner. Here, the tape is passed over a fourth roller 17 and a second tape tension sensitive device 18 before being led to the upper reel 5. This tape path is effective to allow the tape 10 to be transported between the reels 5 and 6 while being tensioned by the reel drive mechanism, described below, with the tape motion transients being absorbed by the tension sensitive devices 13 and 18.

Figure 2:
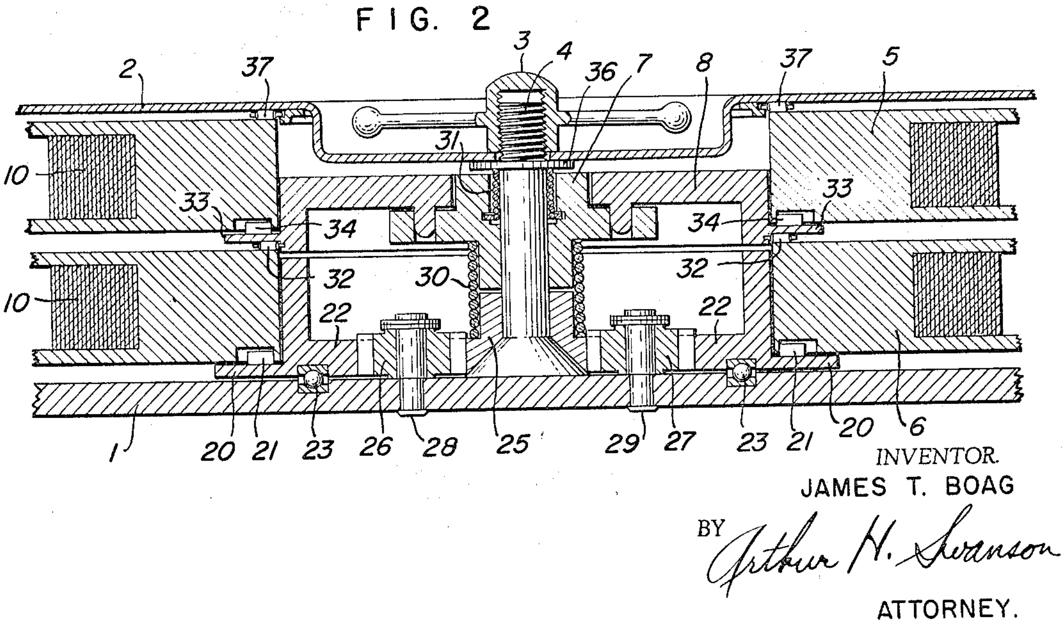
FIG. 2 is a cross-section of the reel drive for the tape cartridge shown in FIG. 1 taken along line 2—2.

The reel drive mechanism, used to tension the tape 10, is shown in FIG. 2. As shown therein, the lower reel 6 is supported on a lower reel hub 20 and driven by a drive tab 21 affixed to the hub 20. The hub 20 is arranged as an annular element having a ring gear 22 attached to the inside periphery thereof. The hub 20 and ring gear 22 are supported by a bearing means 23 inserted in the bottom of the container 1. The hub 20 and ring gear 22 are disposed concentrically with the post 4 and spaced therefrom. A lower reel drive gear 25 is rotatably concentrically supported on the post 4. A pair of idler gears 26 and 27 are disposed between the drive gear 25 and ring gear 22 and rotatably supported on pins 28 and 29, respectively.

The drive gear 25 is operatively connected by a spring torque clutch 30 to the upper reel drive hub 7. The upper drive hub 7 is centrally journaled on the post 4 and is operatively connected thereto by an antireverse spring clutch 31. The drive hub 7 is arranged to carry the inner periphery of the annular upper reel hub 8. The outer periphery of the hub 8 is supported on the lower reel 6 by a thrust bearing 32. The hub 8, in turn, is arranged to support the upper reel 5 on a flange 33 projecting from the outer periphery of hub 8. The upper reel 5 is driven by a drive tab 34 fastened to the flange 33.

The cover 2 is fastened to the post 4 by wing nut 3 and is spaced from the upper ring by a loosely fitting spacing ring 36. Additionally, the cover 2 is supported on the upper surface of reel 5 by a cover thrust bearing 37. The thrust bearing 37 is carried by the inside surface of the cover 2 and is effective to permit rotation of the upper reel 5.

Figure 3:
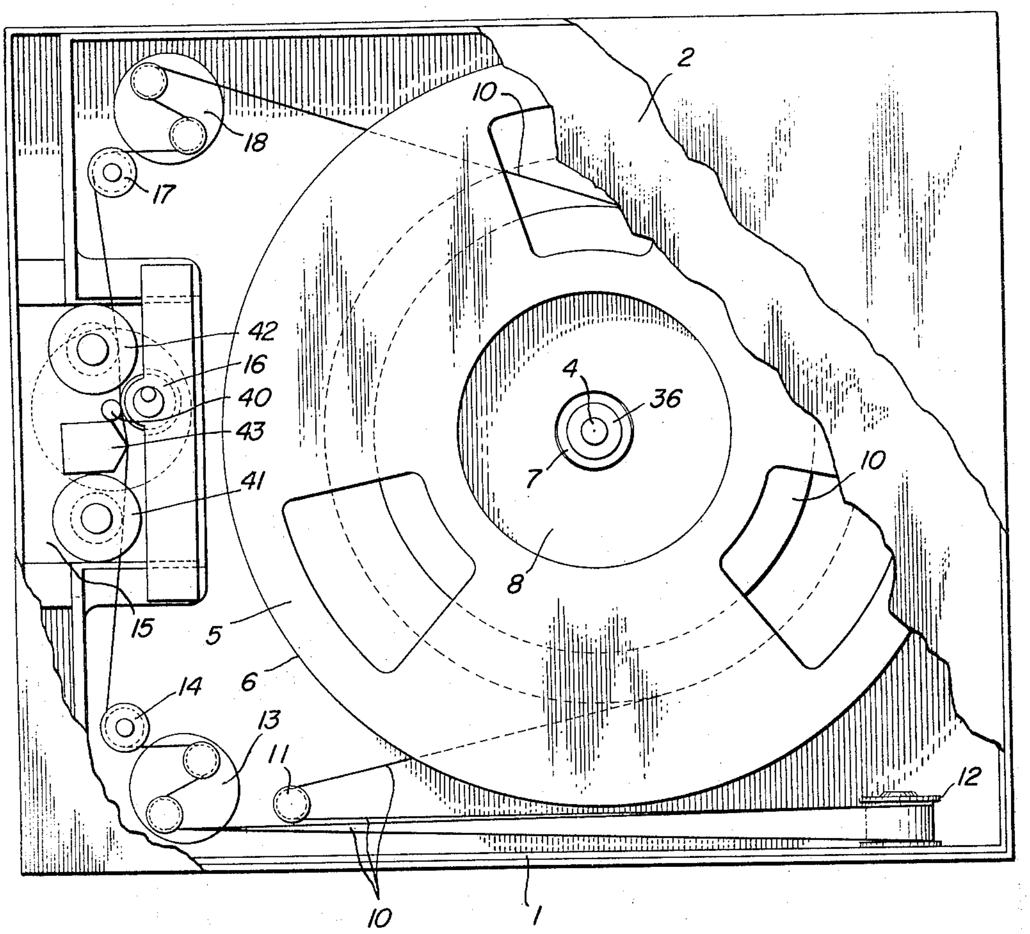
FIG. 3 is a top view of the tape cartridge shown in FIG. 1 in combination with a tape drive mechanism.

Referring now to FIG. 3, there is shown a pictorial view of the container 1 and reel mechanism in an operative relationship with a driven tape drive capstan 40. The tape capstan 40 is mounted in related capstan drive equipment having motor means for rotating the capstan 40. This related apparatus is arranged to support the container 1 as a tape cartridge and to press the capstan 40 against the pressure roller 16 with the tape 10 held therebetween. A pair of tape guides 41 and 42 are disposed on both sides of the tape capstan 40. A tape recording and/or reading head means 43 is also positioned adjacent to the capstan 40 and in operative contact with the tape 10. The guides 41, and 42, the capstan 40 and the head 43 are arranged to enter the container 1 through the opening 15 when the container 1 is placed in an operative position on the associated tape handling equipment. In this position, the tape guides 41 and 42 are effective to support the tape 10 while the head 43 is operatively associated with the information recorded on the tape 10. The tape 10 is driven by the capstan 40 between the lower reel 6 and the upper reel 5, in cooperation with the reel drive shown in FIG. 2.

In operation, the reel drive shown in FIG. 2, is effective to tension the tape 10 during the movement of the tape 10 between the supply reel 6 and the takeup reel 5. The tape 10 is pulled off the supply reel 6 by the capstan 40 acting in combination with the pressure roller 16. As the tape 10 is withdrawn from the supply reel 6, the lower reel hub 20 is driven by the movement of the reel 6 through tab 21. The movement of hub 20 is effective to drive the idler gears 26 and 27 through the ring gear 22. This movement of the idler gears 26 and 27 is arranged to rotate drive gear 25 on the post 4 in a reverse direction from the ring gear 22. The rotation of the ring gear 25 is coupled by spring clutch 30 to the upper drive hub 7. The drive hub 7, in turn, is arranged to drive the takeup reel 5 through the reel support hub 8 in a direction to reel the tape 10 on takeup reel 5.

The gear rotation arrangement shown in FIG. 2 is effective to drive the drive gear 25 faster than the rotation of ring gear 22. Thus, the takeup reel is driven faster than the supply reel. Since this drive operation is effective to takeup the tape 10 faster than it is being supplied by the supply reel 6, the net effect is to tension the tape 10. The slip clutch 30 is provided in the driving train to allow the supply reel 6 to rotate without excessively tensioning the tape. The slipping torque of the spring clutch 30 is determinative of the tension supplied to the tape 10. The spring clutch 30 is particularly suitable for this drive train as a result of the stable and repeatable slipping torque characteristic available therefrom. The tension of the tape 10 across the head 43 is maintained at a constant value during the entire reeling and unreeling operation of the reel drive mechanism. The anti-reverse spring clutch 31 is provided to prevent a spilling of the tape 10 from the reels 5 and 6. Thus, a reverse rotation of the takeup reel 5 would be effective to operate the spring clutch 31 through the reel drive hub 7. This motion of the clutch 31 is arranged to seize the post 4 to prevent the corresponding motion of the reel 5. A proper direction of rotation of the takeup reel 5; i.e., a direction which winds up the tape 10 on the reel 5, is effective to disengage the clutch 31 from the post 4 and allow rotation of the reel 5. Thus, the takeup reel 5 is driven to wind up the tape 10 by the rotation of the supply reel 6 at a faster rotary speed than that of reel 6 to tension the tape 10, during its entire traverse between the reels 5 and 6, while a reverse rotation of reels is prevented by the spring clutch 31.

Accordingly, it may be seen, there has been provided, in accordance with the present invention, a tape reel drive having particular utility in a tape cartridge to provide a one-way motion of the tape between a pair of reels while accurately tensioning the tape during the entire traverse operation of the tape between the reels.

What is claimed is:

1. A tape cartridge for coaxially mounting a plurality of tape reels having substantially equal internal diameters comprising container means having a cover, a pair of tape reel drive hubs adapted to receive said reels, a common axle arranged to rotatably support said drive hubs and thereby said reels in a stacked concentric relationship between said container means and said cover for convenient access to said reels, and a spring clutch arranged to operatively connect said drive hubs in mutual driving communication, one of said drive hubs including means for driving the second of said drive hubs at a higher rotational speed than said one of said drive hubs.

2. A tape cartridge for coaxially mounting a pair of tape reels having substantially equal internal diameters comprising container means having a cover, a first annular tape reel drive hub arranged to support said first tape reel and having a ring gear configuration on a peripheral surface, a gear train connected to said ring gear surface arranged to produce a higher output speed of rotation than the rotational speed of said ring gear and in a reverse direction therefrom, a second annular tape reel drive hub arranged to support said second tape reel in a stacked concentric relationship to said first tape reel between said container means and said cover for convenient access to said reels, and spring clutch means arranged to operatively connect the output motion of said gear train to said second tape reel drive hub.

3. A tape cartridge as set forth in claim 2 including a common axle arranged to support said first and second drive hubs in said stacked concentric relationship.

4. A tape reel drive comprising a first tape reel drive hub arranged to receive a tape reel, said hub being further arranged as an annular element having a ring gear configuration on an inner peripheral surface, an axle concentrically located with respect to said hub, a drive gear rotatably mounted on said axle within said hub, an idler gear disposed between said ring gear and said drive gear, a second tape reel drive hub rotatably mounted on said axle and spaced from said drive gear arranged to receive a second tape reel, having an internal diameter substantially equal that of said first tape reel, in a stacked concentric relationship therewith, and spring clutch means arranged to operatively connect a motion of said drive gear to said second hub.

5. A tape reel drive as set forth in claim 4 including an anti-reverse spring clutch connected between said second hub and said axle to allow a one-way rotation of said second hub.

References Cited by the Examiner

UNITED STATES PATENTS

| | | | |
|---|---|---|---|
| 2,971,715 | 2/1961 | Mitchell | 242—55.13 |
| 2,975,990 | 3/1961 | Rodriguez | 242—55.13 X |
| 3,084,880 | 4/1963 | Grant et al. | 242—55.13 |

FRANK J. COHEN, *Primary Examiner.*

GEORGE F. MAUTZ, *Examiner.*